United States Patent [19]

Watral

[11] 4,311,023
[45] Jan. 19, 1982

[54] AIR CONDITIONING SERVICING APPARATUS

[76] Inventor: James P. Watral, 3 Ann Ave., Twin Oaks, Mo. 63088

[21] Appl. No.: 150,156

[22] Filed: May 15, 1980

[51] Int. Cl.³ .............................................. F25B 43/02
[52] U.S. Cl. ........................................ 62/468; 62/84; 62/85; 62/475; 55/385 C; 134/169 A
[58] Field of Search ...................... 62/84, 85, 468, 475, 62/292; 134/169 A; 55/171, 185, 186, 187, 385 C, DIG. 25; 210/DIG. 6

[56] References Cited

U.S. PATENT DOCUMENTS

| | | | |
|---|---|---|---|
| 1,674,699 | 6/1928 | Overstrom | 55/186 |
| 2,484,149 | 10/1949 | Dousky | 134/111 |
| 2,519,654 | 8/1950 | Heaney | 134/103 |
| 2,615,456 | 10/1952 | Galusha | 134/111 |
| 2,919,704 | 1/1960 | Butler | 134/102 |
| 3,044,475 | 7/1962 | Thompson | 134/102 |
| 3,118,288 | 1/1964 | Small | 210/DIG. 6 |
| 3,216,430 | 11/1965 | Besser | 134/102 |
| 3,364,658 | 1/1968 | Walker | 55/185 |
| 3,545,227 | 12/1970 | Grahl | 62/475 |
| 3,566,892 | 3/1971 | Logue | 134/102 |
| 3,734,296 | 5/1973 | Proctor et al. | 210/DIG. 6 |
| 3,997,303 | 12/1976 | Newton | 55/185 |
| 4,032,311 | 6/1977 | Bohmrich et al. | 55/385 C |

Primary Examiner—Ronald C. Capossela
Attorney, Agent, or Firm—Paul M. Denk

[57] ABSTRACT

In an apparatus for use for servicing air conditioning equipment, particularly in an automobile, the apparatus includes a container or cannister having a flow tube centrally located within it, extending from its upper closure member to within proximity of its base, with the upper section of the container being removable, and having a filter located therein. During usage, the container is useful for draining the refrigerant and lubricant from an automobile air conditioning system, with the refrigerant filtering through the filter, while the lubricant is collected within the container, and can be reused. The container also includes a magnetic member associated with the base to assure stable attachment of the apparatus to any metallic supporting surface during usage.

17 Claims, 4 Drawing Figures

AIR CONDITIONING SERVICING APPARATUS

BACKGROUND OF THE INVENTION

This invention relates generally to a filtering apparatus, and more specifically to a modified container useful for servicing particularly automobile air conditioning systems and preferably for use in siphoning off its refrigerant and contained lubricant, or for adding lubricant back into the system.

Numerous styles of filtering apparatuses are available in the art, as shown particularly in prior patents, but primarily for use as a means for cleaning associated apparatuses, such as oil filters, or the like. For example, such is shown in the U.S. Pat. to Logue, et al, U.S. Pat. No. 3,566,892, wherein a filter cleaning apparatus comprising a compartmentalized container having a tubular member therein is disclosed. Similar types of devices are shown in the U.S. Pat. to Butler, No. 2,919,704, Galusha, U.S. Pat. No. 2,615,456, and the U.S. Pat. to Thompson, No. 3,044,475. In addition, other United States patents showing reservoir type devices for collecting fluids are shown in the U.S. Pat. to Dick, No. 3,216,429, Bousky, U.S. Pat. No. 2,484,149, and Heaney, U.S. Pat. No. 2,519,654.

The current invention, while incorporating some of the structure of related prior art devices of this category, does present a combination of elements that are associated in a somewhat different structural relationship, and in addition, functions primarily as a collector of air conditioning lubricants, while allowing the discharge of its escaping refrigerant gases. Thus, while there may be a slight similarity of structural means, when comparing the prior art with the current invention, their operations and obtained results are significantly different.

It is, therefore, the principal object of this invention to provide a container that is useful for both collecting lubricants being released in conjunction with a refrigerant from an air conditioning system, and particularly from the automobile, and, one that can be also used as a reservoir for delivering lubricant back into such a system during its recharging.

Another object of this invention is to provide a rather uniquely compacted air conditioning servicing apparatus that is constructed to function in a fail safe manner for processing of the lubricant and refrigerant normally used in conjunction with such an air conditioner.

Another object of this invention is to provide a container for use for servicing an air conditioner, particularly for an automobile, that possesses adequate controls for assuring its appropriate usage and functioning during application.

Still another object of this invention is to provide a cannister that is conveniently calibrated and contains suitable gauge means that can assist mechanics when recharging particularly an automobile air conditioner.

Yet another object of this invention is to provide an air conditioning evacuation cannister that incorporates connecting means, in the form of an attaching magnet, that is useful for stabilizing the cannister during its application.

Still another object of this invention is to provide an air conditioning servicing container that incorporates filter means within its upward segment, so that the refrigerant gases can be conveniently and easily vented to the atmosphere while its lubricant is desirably collected.

Another object of this invention is to provide an air conditioning servicing apparatus that can be quickly attached to the air conditioner being serviced within a minimum of time and with little mechanical manipulation.

Still another object of the invention is to provide an air conditioning servicing apparatus that includes various filtering means that can be periodically checked to determine the possibility of contamination within the air conditioning system.

A further object of this invention is to provide a cannister that is useful for collecting and recycling an air condition lubricant back into its system.

These and other objects will become more apparent to those skilled in the art upon reviewing the summary of this invention, and upon undertaking a study of the description of its preferred embodiment in view of the drawing.

SUMMARY OF THE INVENTION

This invention contemplates the combined structure of a cannister or container, having a flow tube centrally located therein, being secured with its upper closure member, with the bottom of the tube extending downwardly towards the interior bottom of the said container. Provided upwardly of the flow tube, upon that portion that extends out of the container and its closure member, there may be located a valve means, such as a petcock or spigot, so that during usage of this container its operations may be immediately shut off, when such may be desired, or when an emergency situation is encountered.

The upper portion of the container is removable, and located within the upper portion of said container is a filter means, the filter functioning to allow the passage of any refrigerant gases therethrough, and their escape to the atmosphere by passage through vent openings provided within this region of the container. Provided in the downward portion of the container, and affixed onto the lower end of its flow tube, there is another filter means, with this filter being useful for collecting any contaminates that may be contained within the discharging refrigerant gases, or within the lubricant being drained from the air conditioning system.

DESCRIPTION OF THE PREFERRED EMBODIMENT

Figure 1:
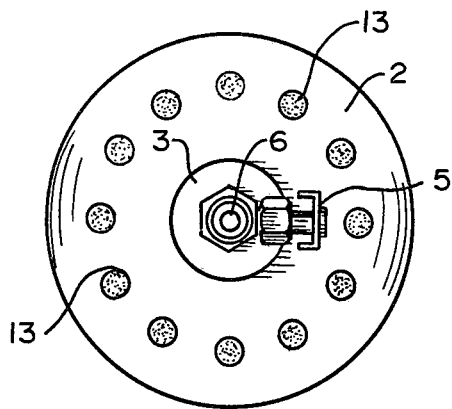
FIG. 1 discloses a top view of the air conditioning servicing apparatus of this invention.
Figure 3:
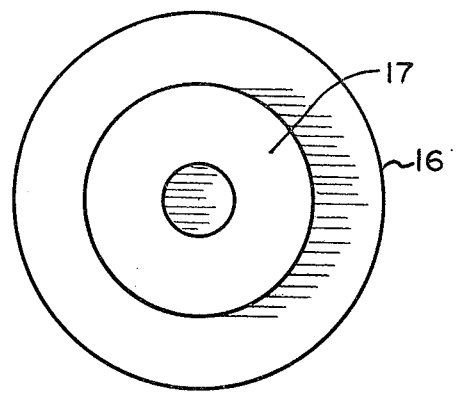
FIG. 3 discloses a bottom view of the apparatus.
Figure 2:
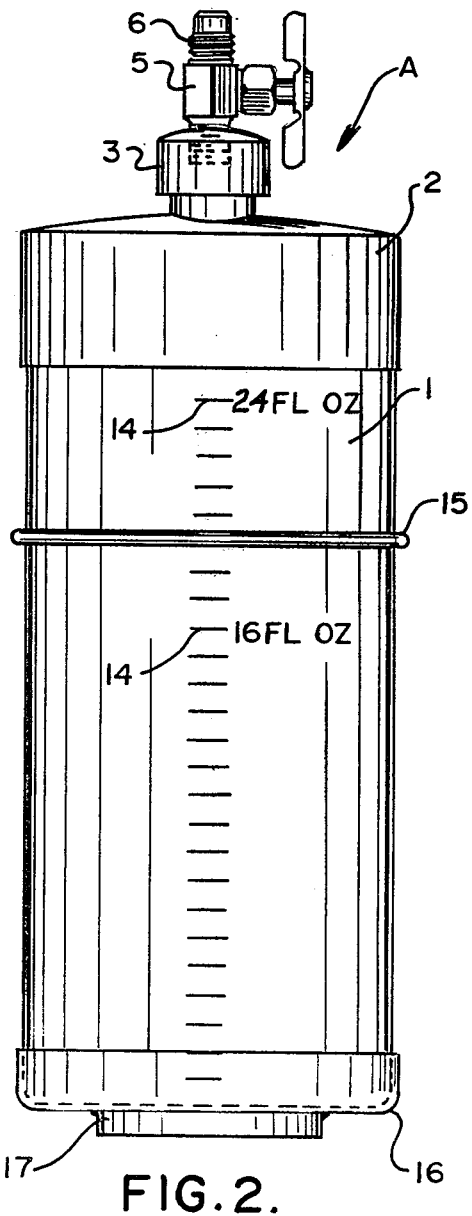
FIG. 2 furnishes a side view of the apparatus.

In referring to the drawing, and in particular FIGS. 1 and 2, there is shown the air conditioning servicing apparatus A of this invention. It comprises a container 1 which, in the preferred embodiment, may be of approximately quart size, or the like, with that container having a removable upper portion 2. Provided threadedly engaging upon that upper portion 2, or engaging by any other hermetically sealed manner, is a closure member 3, which closure member has extending therethrough a flow tube 4. See also FIG. 4. The upper section of the flow tube, or that portion which extends out of the closure member 3, may have a valve means 5 connected therein, and this valve means may incorporate a spigot or petcock, of the type shown, for providing immediate shut off during usage of this apparatus. Provided at the top end of the flow tube 4, or connected therewith, are thread means 6 and which are conveniently disposed for providing a service fitting, such as one connectible with a flexible hose and that may extend for some distance to and connection with preferably the high pressure hose line of the air conditioning manifold gauge, as when discharging, or when used for returning or adding air conditioning lubricating oil to the system when the vacuum formed through operation of the air conditioning vacuum pump, as during evacuation pump down, is occurring. The hose line is not shown herein, but any moderately high pressure hose line having fittings at its end that may conveniently thread onto the aforesaid air conditioning lines will function effectively for attachment of this servicing apparatus to the automobile air conditioning system.

Figure 4:
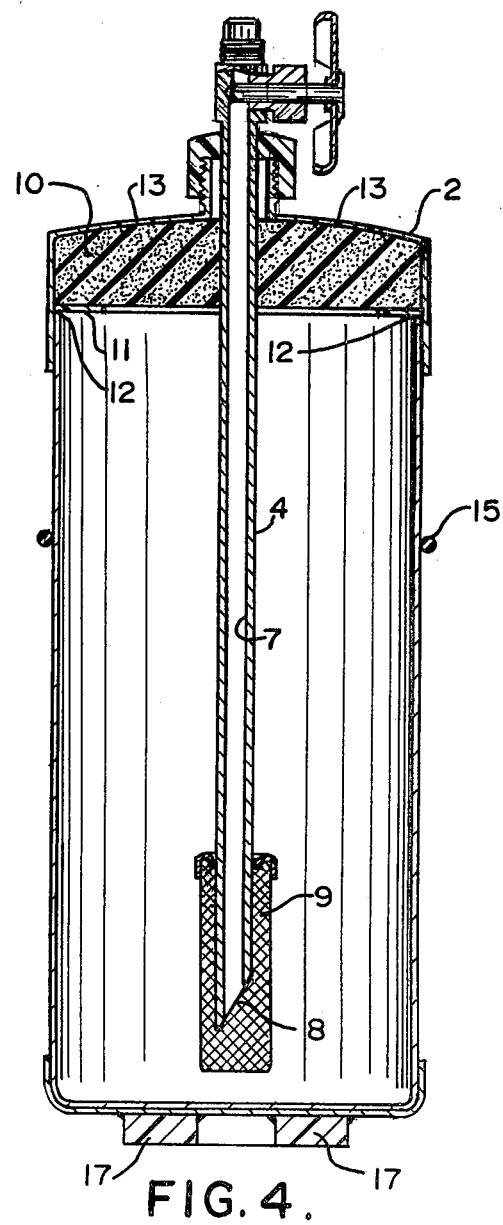
FIG. 4 provides a central sectional view of the entire apparatus along its full length.

As further seen in FIG. 4, the flow tube 4 has a channel provided entirely through it, as at 7, while the bottom end of the said flow tub is cut on a slant, as at 8, and covered by a filter means 9 so as to have the ability to collect any debris, such as rust, that may have accumulated within the air conditioning system, and which is being carried free of the same through discharge of its refrigerant gases and the aforesaid lubricant.

Provided within the upward portion 2 of the container is filter 10, which filter is of a spongy texture, and which will allow gas to pass through, but prevent the untimely escape of any of the lubricant oils being discharged from the air conditioning system during release of the pressurized gas. This filter may be constructed of any filter material, but preferably is made of any one of the expanded urethanes that are useful for this purpose. A retaining ring 11 may be conveniently provided at the bottom of the filter 10, and entertain a snug fit within the said portion 2, so as to assure the retention of the filter 10 in place, particularly during usage of the invention. The upper edge 12 of the container wall 1 rest against this retainer 11 so as to assure that the retainer and its embraced filter remain in position during apparatus usage.

Within the upper wall of the portion 2 of the container there are provided a series of vent openings 13, encircling the flow tube and closure member 3 of the apparatus. As the refrigerant gases are being filtered through the member 10, they are then vented into the atmosphere by passage through the vent openings 13. And, at the same time, any lubricant being discharged during this draining procedure is prevented from passing through or out of the container 1, by means of the filter 10, with such oils accumulating within the lower segment of this cannister. The retaining means 11 is constructed in the form of a ring, having an opening centrally through it, as shown, to provide sufficient clearance for direct passage of the refrigerant gases into and through the filter 10.

After usage of this apparatus, and particularly where a supply of lubricant may be contained within it, after its discharge from the air conditioning system, where such lubricant is not going to be immediately recharged back into the system, any form of cap may be threaded onto the end 6 of the flow tube, to preserve the collected oil.

The container 1 of this invention is preferably fabricated from a lightweight and clear plastic material, such as polyethylene or polyvinyl chloride, affording sighting into it during its evacuation of the air conditioning system, so that the mechanic can determine what amount of lubricant is properly being accumulated, while the gas is discharging from the same. In addition, so that the operator will know as to fairly accurately what amount of lubricant is being discharged from the air conditioning system, a series of calibrations, as at 14, are provided along the length of said container, preferably upon its exterior surface. In addition, a marker, such as the sliding graduated marker 15, and which may be constructed of an O-ring, is furnished externally of the container and can be adjusted as desired for furnishing a clear indication to the mechanic as to the exact amount of lubricant contained within the cannister 1, or how much more lubricant should be added into the same in the event that this invention is used for reapplying lubricant back into the air conditioning system, as during its recharging.

Slidingly fitting upon the bottom of the container 1 is an embracing sleeve 16, and which has integrally connected to it, or adhered thereto by means of an adhesive, or being held in position by means of encapsulation through plastic, is a permanent magnet 17. This is desirable, and is found to be very useful, particularly where the mechanic must manipulate the various valves and other instrumentalities associated with the auto air conditioner, but needs to retain the cannister upright during its functioning in collecting the lubricant while the refrigerant gases are being discharged. Hence, the entire cannister can be rested upon a metallic surface, in an upright position, adhered thereto by means of the magnet 17, thereby freeing the mechanic for other necessary duties, such as in manipulating the various connections to this container, or for even leaving the container isolated during a draining proceeding, freeing the mechanic for other service.

In addition, the magnet being located at this position has the tendency to adhere any metallic elements passing through the filter 9 to the bottom 8 of the container, and thereby prevent their mixing into the fluid or lubricant contained within the cannister.

The function of this air conditioning servicing apparatus, which may further be defined as an evacuation cannister, can be quickly understood by anyone skilled in this art, wherein a flexible high pressure line (not shown) may be threaded by means of a fitting onto the upper end 6 of the apparatus flow tube, and then connected to the air conditioning manifold gauge. All the systems are then opened, thereby allowing the air conditioner to be quickly drained of its refrigerant, and manifold gases, by maintaining the manifold line at full open position, both the low and high side lines combined, for the purpose of then collecting the lubricating oil within the container, through the flow tube 4, and allowing the associated refrigerant gases to pass through the filter 10 and out of the vent openings 13. Lubricating oils that normally have been lost during system discharging can now be collected, accurately measured, and replaced back into the air conditioning system by a siphoning operation. This can be achieved by hooking up the same flexible hose, as previously defined, to the high side of the manifold hose system, with the manifold side of the hose being connected to the high side fitting of the air conditioning system, and then starting the vacuum pump for the air conditioning system evacuation. The proper amount of oil or lubricant will have already been added to the container 1, its measurements having been made fairly accurately through the use of its various calibrations, and its graduated marker 15, with the contained oil within the cannister then being siphoned back into the air conditioning system by turning the same on.

Various modifications or changes within the structure of this invention may occur to those skilled in the art upon reviewing the foregoing description. Such variations or modifications, if within the spirit of this invention, are intended to be encompassed within the scope of the claims to patent protection issuing upon this invention. The description of the preferred embodiment as set forth herein is explained primarily for illustrative purposes only.

Having thus described the invention what is claimed and desired to be secured by Letters Patent is:

1. An air conditioning servicing apparatus principally for use in conjunction with an automobile, or the like, air conditioning system of the type which includes a charge of refrigerant and lubricant materials, comprising, a container of appreciable capacity for holding at least the quantity of lubricant normally added to the aforesaid type of air conditioning system, an upper closure member for the container, and an upper portion for the container, said closure member connecting upon said upper portion of the container, said upper portion of the container having at least one vent opening therethrough for allowing the escape of gaseous refrigerant being released from the aforesaid type of system while capturing the discharging lubricant material, a filter provided within said upper portion of the container to filter the release of the said type of refrigerant, a flow tube extending down the container, said closure member having an aperture therethrough and with the flow tube being located through said aperture, whereby the flow tube communicated with the aforesaid type of air conditioning system for accomodating the discharge of any refrigerant and lubricant to the container where the lubricant may be collected and the gaseous refrigerant be released through its upper disposed filter to the atmosphere.

2. The invention of claim 1 and including a valve means operatively associated with the flow tube and said valve means capable of being opened to allow passage of the said refrigerant and lubricant therethrough, or closed to curtail the passage of such materials.

3. The invention of claim 2 and wherein said valve means is located externally of the container and above its closure member.

4. The invention of claim 3 and wherein said valve means comprises a petcock.

5. The invention of claim 1 and wherein said filter seats within the upper portion of the container, and said upper portion of the container having at least one aperture therethrough to vent the gaseous refrigerant passing through the said filter.

6. The invention of claim 5 and wherein there are a series of vent apertures provided through the said container upper portion.

7. The invention of claim 5 and wherein said filter is fabricated to a sponge like consistency.

8. The invention of claim 7 and wherein said filter is formed of a polyurethane.

9. The invention of claim 8 and including a retainer associated within the upper portion of the container and useful for holding the filter in place.

10. The invention of claim 1 and hwerein said flow tube extends downwardly into proximity with the bottom of the container.

11. The invention of claim 10 and wherein the lower end of the flow tube is slanted.

12. The invention of claim 10 and including another filter means enveloping the said lower end of the flow tube.

13. The invention of claim 12 and wherein said filter means comprises a screen filter.

14. The invention of claim 1 and wherein said container is quart size.

15. The invention of claim 14 and including calibration provided upon the container to indicate the quantity of lubricant contained therein.

16. The invention of claim 15 and including an indicator associated with the container and upon setting furnishing an indication regarding the quantity of materials being handled by the said container.

17. The invention of claim 1 and including a magnetic member operatively associated with the base of the container to assure stable attachment of the apparatus to a metallic support during usage.

* * * * *